US011573787B1

(12) United States Patent
Hashimi et al.

(10) Patent No.: US 11,573,787 B1
(45) Date of Patent: Feb. 7, 2023

(54) HOT RELOADING A RUNNING APPLICATION WITH AN UNSAVED SOURCE CODE CHANGE

(71) Applicant: Microsoft Technology Licensing, LLC, Redmond, WA (US)

(72) Inventors: Sayed Ibrahim Hashimi, Jacksonville, FL (US); Dmitry I. Lyalin, Snoqualmie, WA (US); William Edwin Hiebert, Redmond, WA (US); Tomas Matousek, Redmond, WA (US); Damian Paul Edwards, Issaquah, WA (US); Stephen Harris Toub, Winchester, MA (US); Pranav Krishnamoorthy, Newcastle, WA (US); Isadora Sophia Garcia Rodopoulos, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/472,303

(22) Filed: Sep. 10, 2021

(51) Int. Cl.
*G06F 8/71* (2018.01)
*G06F 8/33* (2018.01)
*G06N 5/00* (2006.01)
*G06F 8/41* (2018.01)

(52) U.S. Cl.
CPC .............. *G06F 8/71* (2013.01); *G06F 8/33* (2013.01); *G06F 8/42* (2013.01); *G06N 5/003* (2013.01)

(58) Field of Classification Search
CPC .... G06F 8/71; G06F 8/33; G06F 8/42; G06N 5/003
See application file for complete search history.

(56) References Cited

U.S. PATENT DOCUMENTS

| 2005/0034109 | A1 | 2/2005 | Hamilton et al. |
| 2016/0216962 | A1* | 7/2016 | Wang .................. G06F 8/71 |
| 2017/0147312 | A1 | 5/2017 | Weber et al. |
| 2020/0319868 | A1* | 10/2020 | Viana ................ G06F 9/5077 |

OTHER PUBLICATIONS

Pankaj More, "Hot Code Reloading in Cloud Haskell" (Year: 2014).*
Tashildar et al., "Application Development Using Flutter" (Year: 2020).*
Skinner et al., "LiveSim: A Fast Hot Reload Simulator for HDLs" (Year: 2020).*

(Continued)

Primary Examiner — Phillip H Nguyen
(74) Attorney, Agent, or Firm — Workman Nydegger

(57) ABSTRACT

Hot reloading a running application with an unsaved source code change. A code change to a source code of a running software application that is associated with a project type is identified. The code change is stored within an in-memory editor buffer, and is uncommitted to any source code file. It is determined that the code change can be applied to the running software application using hot reload. Hot reload agent(s) associated with the project type are identified. Using the hot reload agent(s), the code change is communicated to an application runtime associated with the running software application. At least one process of the running software application invokes a new compiled code entity corresponding to the code change.

20 Claims, 4 Drawing Sheets

(56) References Cited

OTHER PUBLICATIONS

Martin Bigio, "Introducing Hot Reloading" (Year: 2016).*
Rap Payne, "Beginning App Development with Flutter" (Year: 2019).*
Boggan, Pierce, "Announcing XAML Hot Reload for Xamarin. Forms", Retrieved from: https://devblogs.microsoft.com/xamarin/xaml-hot-reload/, Jul. 11, 2019, 8 Pages.
"International Search Report and Written Opinion issued in PCT Application No. PCT/US22/037524", dated Nov. 3, 2022, 13 Pages.

* cited by examiner

HOT RELOADING A RUNNING APPLICATION WITH AN UNSAVED SOURCE CODE CHANGE

BACKGROUND

Developing and debugging software applications is an iterative process. For example, a developer may frequently go through a development workflow that includes (i) running a subject application, (ii) identifying an application feature that needs to be modified or added, (iii) making changes to one or more source files for the subject application (e.g., using an editor) to implement the modification/addition, (iv) saving those source code files, (v) rebuilding the subject application (e.g., using a compiler toolchain), (vi) restarting the subject application, and (vii) interacting with the subject application to validate the modification/addition. This workflow can be cumbersome and time consuming, and the act of rebuilding and restarting the subject application can take significant time.

At times, running the subject application additionally involves attaching a debugger to the application to aid in testing and debugging the application. While debuggers have a variety of features, a primary use of a debugger is to enable the developer to track the subject application's operations in-progress and monitor changes in computer resources utilized by the application. Most debuggers include the ability to suspend execution of the subject application at specific points (e.g., using breakpoints or watchpoints). When a subject application is suspended at a breakpoint or watchpoint, some debuggers show the location in original source code and/or a machine code disassembly corresponding to the point of suspension.

BRIEF SUMMARY

Some development environments and application runtimes support hot reload technology. Hot reload implementations detect when changes are made to one or more source code files on disk, and apply those changes to a running application. Hot reload operates by creating new types and new versions of updated methods, and the new versions of these updated methods are only executed after they are invoked for a next time after the hot reload update.

However, existing hot reload implementations are only able to apply source code changes that have actually been committed to disk (i.e., saved to a source code file). For example, existing hot reload implementations detect when a new version of a source code file is available, and update a corresponding running application based on recompiling that source code file in its entirety (e.g., in a compiled language), or based on interpreting a new version of a file (e.g., in an interpreted language).

At least some embodiments described herein enable hot reloading of a running application with an unsaved source code change. For example, embodiments detect when a code change to source code within an editor program is complete and syntactically correct. When the source code uses a compiled language, embodiments incrementally compile that code change to create a code entity (or entities) that can be loaded into a running application's memory space, and then use one or more hot reload agents to push that code change to an application runtime corresponding to the running application as a newly compiled code entity (or entities), or in a form that can be interpreted. Thus, embodiments herein enable source code changes to be applied to a running application substantially immediately after a developer has finished typing a complete code change (e.g., one that is syntactically correct and syntactically complete, and thus able to be incrementally compiled by a compiler or able to be interpreted by an interpreter). This streamlines the application development workflow, by removing express steps for saving source code files, potentially rebuilding those source code files, and restarting a subject application. Instead, source code changes are applied to a running application without any extra developer effort.

At least some embodiments described herein further operate to enable hot reloading of a running application with a static file change. For example, embodiments detect when there is static file change to source of the running software (e.g., based on identifying an uncommitted change to a static file, or based on identifying a new version of a static file), and uses one or more hot reload agents to push that static file change to an application runtime corresponding to the running application. Thus, these embodiments enable static file changes to be applied to a running application substantially immediately after creation of the static file change. This also streamlines the application development workflow, by removing express steps for saving static files and restarting a subject application. Instead, static file changes are applied to a running application without any extra developer effort.

In some embodiments, method, systems, and computer program products are directed to hot reloading a running application with an unsaved source code change. These embodiments identify a code change to a source code of a running software application that is associated with a project type. The code change is stored within an in-memory editor buffer and is uncommitted to any source code file. These embodiments also determine that the code change can be applied to the running software application using hot reload. These embodiments also identify one or more hot reload agents associated with the project type. Then, using the one or more hot reload agents, these embodiments, communicate the code change to one or more application runtimes associated with the running software application. At least one process of the running software application invokes at least one of one or more new code entities corresponding to the code change.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
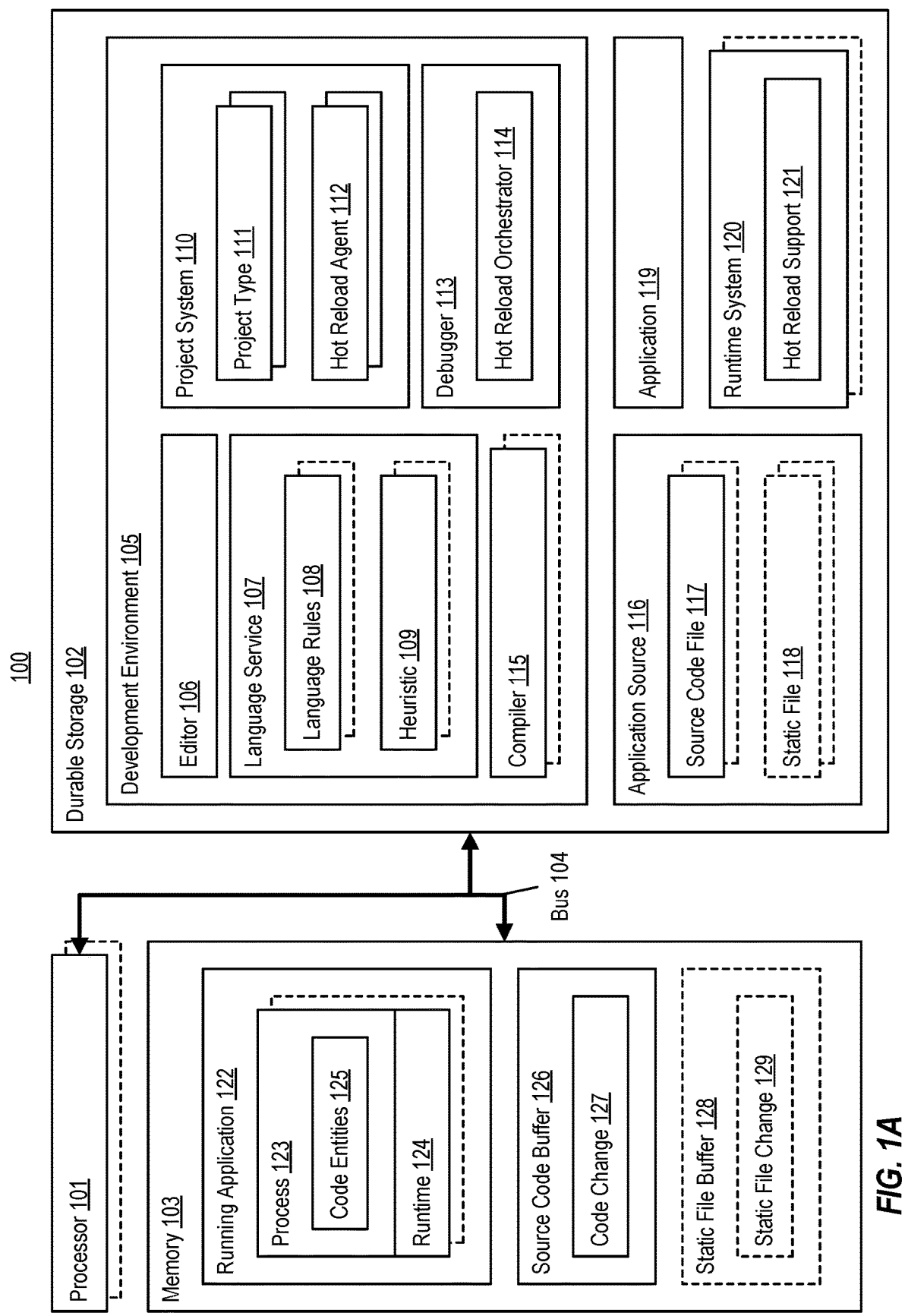
FIG. 1A illustrates an example computer architecture that facilitates hot reloading a running application with an unsaved source code change.

FIG. 1A illustrates an example computer architecture 100 that facilitates hot reloading a running application with an unsaved source code change. As shown, computer architecture 100 comprises or utilizes a special-purpose or general-purpose computer hardware, such as, for example, a processor 101 (or, as shown, a plurality of processors), a memory 103 (e.g., main or system memory), and a durable storage 102, which are communicatively coupled using a bus 104 (or a plurality of busses).

Embodiments within the scope of the present invention include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., memory 103 and/or durable storage 102) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM (e.g., memory 103) and/or to less volatile computer storage media (e.g., durable storage 102) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the durable storage 102 stores computer-executable instructions and/or data structures corresponding to software, such as a development environment 105, an application 119, and a runtime system 120 (or, as shown, a plurality of different runtime systems) used to execute the application 119. Example runtime systems include the common language runtime (CLR) for executing applications written using a variety of .NET technologies (e.g., ASP.NET, XAML, C#, F#, etc.), a web browser engine (e.g., including a document object model) for executing web applications, and the like.

The durable storage 102 also stores data, such as application source 116 corresponding to the application 119. As shown, application source 116 includes a source code file 117 (or, as shown, a plurality of source code files) comprising at least a portion of source code written in a compiled programming language. Additionally, application source 116 may also include a static file 118 (or, as shown, a plurality of static files). As used herein, a static file is a file that stores data other than source code or executable code. As examples, at static file may store an image, CSS, and the like.

The memory 103 is capable of storing a broad variety of executable code and data. For example, the memory 103 is shown as storing runtime data for a running application 122. In FIG. 1A, running application 122 corresponds to application 119. This running application 122 is shown as comprising a process 123 that executes based on a runtime 124. In FIG. 1A, runtime 124 corresponds to runtime system 120. The process 123 is shown as including code entities 125 (e.g., methods, types, etc.) upon which the process 123 executes. As shown, in embodiments the running application 122 comprises a plurality of processes, each of which executes using a runtime system. In some embodiments all of these processes execute using the same runtime system, while in other embodiments different processes execute using different runtime systems.

In general, the development environment 105 includes components configured to develop/modify application software, such as application 119. In some embodiments, the development environment 105 is an integrated development environment (IDE). As illustrated, in some embodiments the development environment 105 includes an editor 106, a language service 107, a project system 110, a debugger 113, and a compiler 115 (or, as shown, a plurality of compilers). It will be appreciated that FIG. 1A illustrates just one example configuration of the development environment 105, and that alternate embodiments the development environment 105 could include additional components, fewer components, or different arrangements of components. For example, in some embodiments, one or more of the compiler 115 or the debugger 113 could be external to the development environment 105.

In embodiments, the editor 106 provides functionality for editing the application sources, such as application source 116 of application 119. For example, FIG. 1A shows that the memory 103 includes a source code buffer 126, and that the memory 103 also potentially includes a static file buffer 128. In embodiments, each of these buffers represents a memory buffer created by the editor 106 as part of editing a source code file 117 and/or a static file 118 that makes up part of the application source 116 of application 119.

In embodiments, the language service 107 provides programming language assistance features for use in conjunction with the editor 106. For example, language service 107 is shown as comprising as set of language rules 108 for a programming language (or, as shown, a plurality of sets of language rules, each for a different programming language). Using these language rules 108, the language service 107 aids in composing source code at the editor 106, such as by providing code completion, content assist (e.g., parameter information, member list information, etc.), code hinting, code syntax highlighting, and the like. The language service 107 is also illustrated as including a heuristic 109 (or, as shown, a plurality of heuristics). This heuristic 109 is used as part of embodiments for hot reloading a running application with an unsaved source code change, as discussed infra.

In embodiments, the project system 110 manages application development projects, such as an application development project embodying one or more files comprising application source 116 of application 119. As shown, in embodiments the project system 110 supports a plurality of project types 111, such as a first project type corresponding to a console application, a second project type corresponding to a web application, a third project type corresponding to a graphical user interface (GUI) application, etc. In embodiments, each project type of project types 111 supports one or more programming language; correspondingly each project type of project types 111 also interfaces with the compiler 115 and/or a runtime system 120 for each of those programming language(s). In embodiments, the project system 110 also includes (or interfaces with) a plurality of hot reload agents 112, which are used as part of embodiments for hot reloading a running application with an unsaved source code change, as discussed infra.

In embodiments, each compiler 115 corresponds to one or more programming languages supported by the language rules 108 and the project system 110, and is used to compile source code from an application development project being managed by the project system 110. In embodiments, compiler 115 supports incremental compiling of only portions of a source code project, and this functionality is used as part of embodiments for hot reloading a running application with an unsaved source code change, as discussed infra.

In embodiments, the debugger 113 comprises traditional functionality of tracing and controlling execution of an executing application, such as application 119. However, in accordance with the embodiments herein, the debugger 113 also comprises a hot reload orchestrator 114. In embodiments, the hot reload orchestrator 114 is configured to coordinate use of other components of the development environment 105 in order to implement methods for hot reloading a running application with an unsaved source code change. While the hot reload orchestrator 114 is illustrated as being part of the debugger 113, it will be appreciated that, in alternative embodiments, the hot reload orchestrator 114 could be separate from the debugger 113, or even separate from the development environment 105. While the hot reload orchestrator 114 is illustrated as a single component, it will be appreciated that at least a portion of the functionality of the hot reload orchestrator 114 may include within one or more other components (e.g., the editor 106, the project system 110, etc.).

In general, embodiments of the hot reload orchestrator 114 operate to enable hot reloading of a running application with an unsaved source code change. For example, embodiments of the hot reload orchestrator 114 detect when a code change to source code within an editor program is complete and syntactically correct. If the source code uses a compiled language, the hot reload orchestrator 114 causes that code change to be incrementally compiled to create a code entity (or entities) that can be loaded into a running application's memory space. The hot reload orchestrator 114 uses one or more hot reload agents to push the code change to an application runtime corresponding to the running application as a newly compiled code entity (or entities), or in a form that can be interpreted. Additionally, embodiments of the hot reload orchestrator 114 operate to enable hot reloading of a running application with a static file change. For example, embodiments of the hot reload orchestrator 114 also detect when there is static file change to source of the running software (e.g., based on identifying an uncommitted change to a static file, or based on identifying a new version of a static file), and use one or more hot reload agents to push that static file change to an application runtime corresponding to the running application.

Figure 1B:
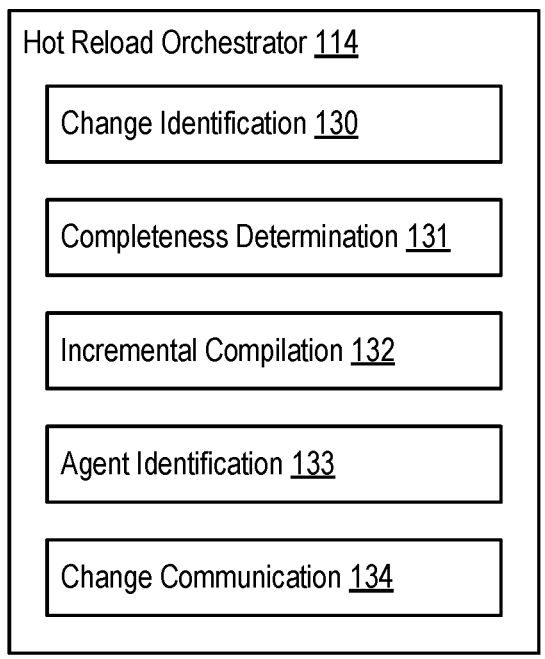
FIG. 1B illustrates an example details of an orchestrator component illustrated in FIG. 1A.

FIG. 1B illustrates example details of the hot reload orchestrator 114 illustrated in FIG. 1A, including example components that facilitate hot reloading a running application with an unsaved source code change. It will be appreciated that the depicted components—including their identity, sub-components, and arrangement—are presented merely as an aid in describing various embodiments of the hot reload orchestrator 114 described herein, and that these components are non-limiting to how software and/or hardware might implement various embodiments described herein, or of the particular functionality thereof.

As shown, the hot reload orchestrator 114 includes a change identification component 130. In some embodiments, the change identification component 130 identifies an uncommitted (i.e., unsaved) source code change affecting a source code file corresponding to a running application (e.g., running application 122). For example, as shown, based on an edit at the editor 106, the source code buffer 126 (e.g., corresponding to source code file 117) comprises a code change 127, which is not yet committed to the source code file 117, and the change identification component 130 identifies this code change 127.

In additional, or alternative, embodiments, the change identification component 130 identifies a static file change corresponding to a running application (e.g., running application 122). In embodiments, the change identification component 130 identifies a new version of a static file corresponding to running application 122. For example, the change identification component 130 identifies a new version of static file 118 that is created by the editor 106 or by an external application (e.g., photo editing software). In additional, or alternative, embodiments the change identification component 130 identifies an uncommitted (i.e., unsaved) change affecting a static file corresponding to running application 122. For example, as shown, based on an edit at the editor 106, the static file buffer 128 (e.g., corresponding to static file 118) comprises a static file change 129, which is not yet committed to the static file 118, and the change identification component 130 identifies this static file change 129.

The hot reload orchestrator 114 also includes a completeness determination component 131. In embodiments, when the change identification component 130 identifies an uncommitted (i.e., unsaved) source code change, the completeness determination component 131 determines if that code change can be applied to the running software application using hot reload.

In embodiments, the completeness determination component 131 utilizes the language service 107 to determine if this code change can be applied to the running software application using hot reload. For example, in embodiments, the language service 107 uses language rules 108 to determine, based on a programming language of the source code, when a code change is syntactically correct and syntactically compete, such that the code change can be incrementally compiled by the compiler 115.

In another example, in embodiments, the language service 107 uses a heuristic 109 (or a plurality of heuristics) to determine when a user input represents a code change that can be applied to application 119 using hot reload. In some embodiments, a heuristic 109 determines that a user input user input represents a code change that can be applied to application 119 using hot reload when the code change is determined to be complete. For example, even though a code change may be syntactically correct, in some embodiments a heuristic 109 delays application of that code change to ensure the code change is actually complete (e.g., as intended by a user) and not being prematurely applied. In various examples, this heuristic ensures a code change is complete by only considering a code change to be complete when the user has completed typing an English word; when the user has completed typing an already existing code element name (e.g., method name, variable name, structure name, class name, etc.); when a threshold amount of time has transpired since typing has concluded; and the like. In an embodiment, this heuristic determines that a code change would be incomplete when it is part of a sequence of changes that would lead to a dead end (e.g., when the code change, while itself syntactically valid, would eventually lead to source code that cannot compile). In embodiments, a heuristic 109 that ensures that a code change is complete (or incomplete) utilizes past user behaviors, such as by training one or more machine learning models based on a user's typing behaviors, based on a user's coding style, based on traits of a particular project, etc.

In embodiments, the completeness determination component 131 determines whether a code change can be applied to the running software application using hot reload based on determining if the code change is actually compatible with hot reload technology being used. For example, some hot reload technologies are limited in the types of code changes that can be applied while an application is running, and the completeness determination component 131 ensures that a give code change can actually be applied using that technology. In some embodiments, the completeness determination component 131 utilizes at least one of hot reload agents 112 and/or at least one of language rules 108 to determine if a given code change compatible with hot reload technology being used.

The hot reload orchestrator 114 also includes an incremental compilation component 132. In embodiments, when using a compiled programming language, the incremental compilation component 132 uses a compiler 115 (or a plurality of compilers) to compile one or more portions of source code of the running application 122 affected by the code change 127 that was identified by the change identification component 130, and that was determined to be complete by the completeness determination component 131. As a result, the incremental compilation component 132 causes creation of one or more new code entities (e.g., a new method, a new type, etc.) for the running application 122.

The hot reload orchestrator 114 also includes an agent identification component 133. In embodiments, the agent identification component 133 identifies at least one of hot reload agents 112 applicable to a project type of a running application (e.g., running application 122). As mentioned, the project system 110 includes (or interfaces with) a plurality of hot reload agents 112. In embodiments, each of hot reload agents 112 interfaces with a runtime system 120 (e.g., using hot reload support 121 of that runtime system) to apply one or more code changes and/or one or more static file changes to a running application (e.g., running application 122). Thus, the agent identification component 133 determines which of these agents is or are applicable to the project type of the running application 122.

Figure 2:
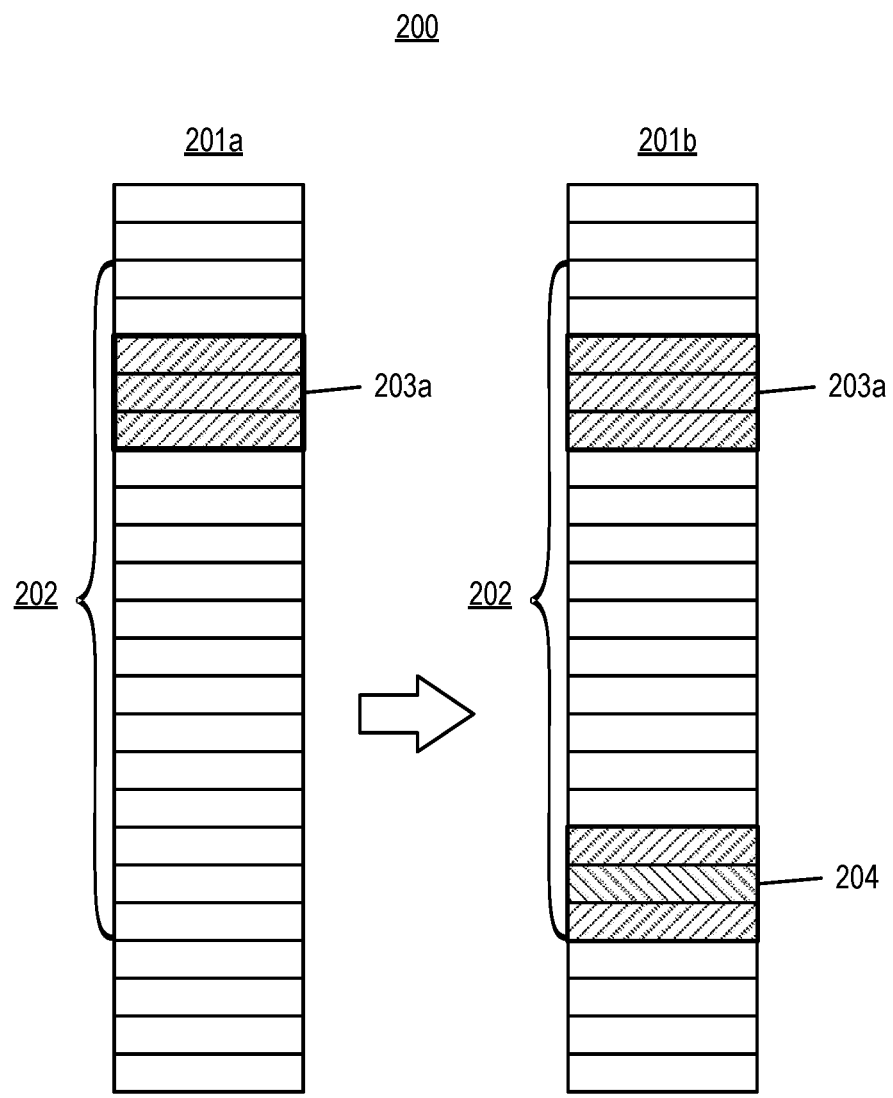
FIG. 2 illustrates an example of updating a running application using hot reload.

In order to illustrate how hot reload works, FIG. 2 shows an example 200 of updating a running application using hot reload. Example 200 shows an example memory layout 201a, including an application space memory 202, such as an application memory space for running application 122. Example 200 also shows a code entity 203a (e.g., one of code entities 125) stored in the application space memory 202. Example 200 also shows another example memory layout 201b after a hot reload update. Here, code entity 203a remains unaffected, while a new version of the code entity is added as code entity 204. In embodiments, this code entity 204 is a new code entity (e.g., a new method, a new type, etc.) created based on operation of the incremental compilation component 132. Since there are now two in-memory-versions of the code entity (i.e., code entity 203a and code entity 204), it is possible for method invocations made before the hot reload to continue to execute based on code entity 203a, while method invocations made after the hot reload to execute based on code entity 204.

Returning to FIG. 1B, the hot reload orchestrator 114 also includes a change communication component 134. In embodiments, the change communication component 134 uses each hot reload agent identified by the agent identification component 133 to communicate the code change identified by the change identification component 130 to the hot reload support 121 of runtime system 120. In embodiments, when using a compiled programming language, the change communication component 134 communicates the new code entity or entities generated by the incremental compilation component 132 to hot reload support 121 of runtime system 120. In embodiments, when using an interpreted programming language, the change communication component 134 communicates the code change hot reload support 121 of runtime system 120 in a form that can be interpreted. In additional embodiments, the change communication component 134 uses each hot reload agent identified by the agent identification component 133 to communicate a static file change to a hot reload support 121 of a runtime system 120. As a result, the hot reload support 121 at each runtime system 120 that receives a new code entity and/or a static file change updates the running application 122 to include the new code entity or entities and/or the static file change.

Figure 3:
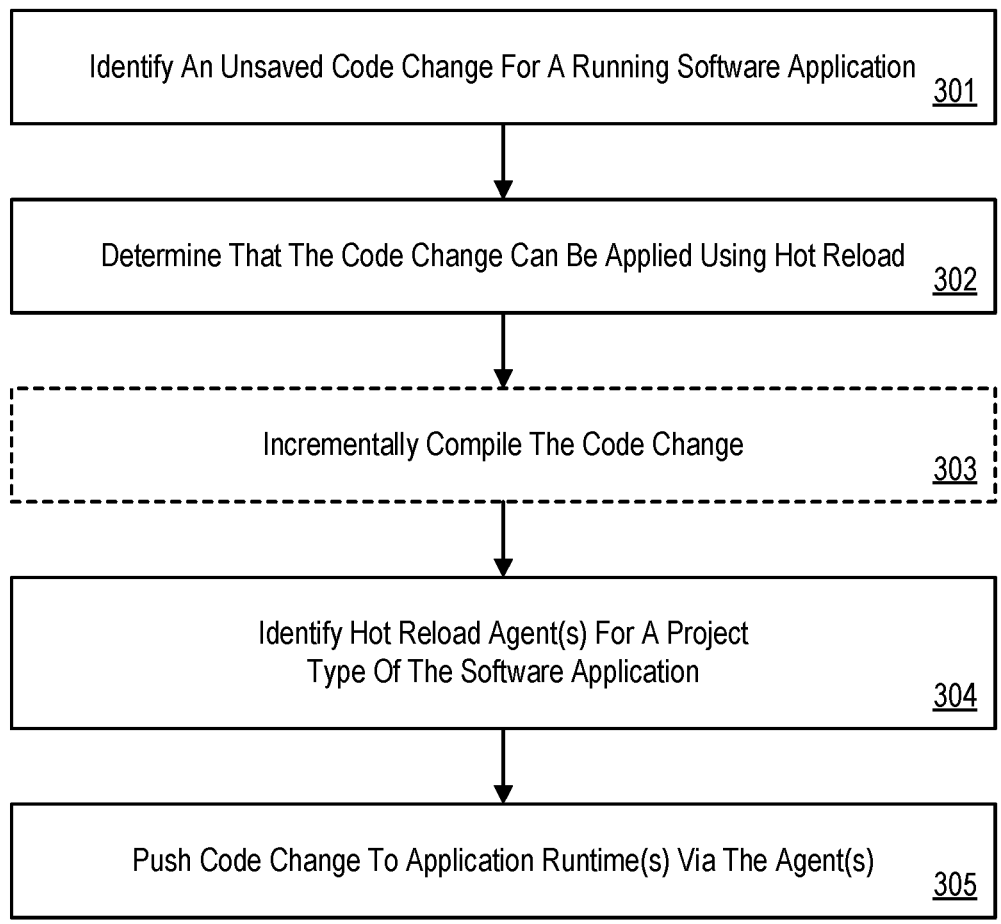
FIG. 3 illustrates a flow chart of an example method for hot reloading a running application with an unsaved source code change.

Further description of the hot reload orchestrator 114 is now given within the context of FIG. 3, which illustrates a flow chart of an example method 300 for hot reloading a running application with an unsaved source code change. In embodiments, instructions for implementing method 300 are encoded as computer-executable instructions (e.g., hot reload orchestrator 114) stored on a hardware storage device (e.g., durable storage 102) that are executable by a processor (e.g., processor 101) to cause a computer system (e.g., computer architecture 100) to perform method 300.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

As shown in FIG. 3, method 300 comprises an act 301 of identifying an unsaved code change for a running software application. In some embodiments, act 301 comprises identifying a code change to a source code of a running software application that is associated with a project type, the code change being stored within an in-memory editor buffer and being uncommitted to any source code file. In an example, the change identification component 130 detects a code change 127 made by a developer at the editor 106 to a source code buffer 126, and which has not been saved/committed to the source code file 117 in the durable storage 102. For example, the code change 127 has not been saved/committed to the source code file 117 either based on an automatic saving process, or by a manual user input.

Method 300 also comprises an act 302 of determining that the code change can be applied using hot reload. In some embodiments, act 302 comprises the completeness determination component 131 determining that the code change can be applied to the running software application using hot reload.

In some embodiments of act 302, determining that the code change can be applied to the running software application using hot reload comprises determining that the code change is syntactically correct for a programming language of the source code. In an example, the completeness determination component 131 utilizes the language service 107, which in turn uses the language rules 108 to determine, based a programming language of the source code file 117, when the code change 127 is syntactically correct.

In some embodiments of act 302, determining that the code change can be applied to the running software application using hot reload comprises determining that the code change is syntactically complete for a programming language of the source code. In an example, completeness determination component 131 utilizes the language service 107, which in turn uses the language rules 108 to determine, based a programming language of the source code file 117, when the code change 127 is syntactically complete.

Additionally, or alternatively, in some embodiments of act 302, determining that the code change can be applied to the running software application using hot reload comprises applying a heuristic to determine that the code change is complete. In an example, the completeness determination component 131 utilizes the language service 107, which in turn uses a heuristic 109 to delay application of a code change to ensure the code change is actually complete (e.g., as intended by a user), and not being prematurely applied. As disclosed supra, example heuristics include considering a code change to be complete when a user has completed typing an English word, when a user has completed typing an already existing code element name, or when a threshold amount of time has transpired since typing has concluded. Example heuristics also include considering whether the code change is part of a sequence of changes that would lead to a dead end. Thus, in some embodiments of act 302, the heuristic determines at least one of whether the code change comprises a complete English word, whether the code change comprises an existing code element name, whether a threshold amount of time has transpired since typing has concluded, or whether the code change is on a dead-end path.

In some embodiments of act 302, determining that the code change can be applied to the running software application using hot reload comprises determining that the code change is compatible with hot reload. In an example, the completeness determination component 131 utilizes at least one of hot reload agents 112 and/or a least one of language rules 108 to determine if a given code change is compatible with the hot reload technology being used.

In some embodiments (e.g., when using a compiled programming language), method 300 also comprises an act 303 of incrementally compiling the code change. In some embodiments, act 303 comprises, based on determining that the code change can be applied to the running software application using hot reload, creating one or more new compiled code entities for the running software application, based on compiling one or more portions of the source code of the running software application that are affected by the code change. In an example, the incremental compilation component 132 uses compiler 115 to compile one or more portions of source code of the running application 122 affected the code change 127 that was identified in act 301, and that was determined to be complete in act 302. As a result, the incremental compilation component 132 causes creation of one or more new code entities for the running application 122. As mentioned, a new code entity (or entities) can be a new method, a new type, etc. Thus, in embodiments of act 303, the one or more new compiled code entities comprises at least one of a method or a type.

In some embodiments of act 303, the incremental compilation component 132 uses a plurality of compilers to compile one or more portions of source code of the running application 122. For example, in embodiments, the running application 122 utilizes a plurality of different programming languages (and, correspondingly, a plurality of different runtimes). Thus, in some embodiments of act 303, creating the one or more new compiled code entities for the running software application, based on compiling one or more portions of the source code of the running software application that are affected by the code change, comprises using a plurality of different compilers for a plurality of different programming languages.

Method 300 also comprises an act 304 of identifying hot reload agent(s) for a project type of the software application. In some embodiments, act 304 comprises identifying one or more hot reload agents associated with the project type. In an example, the agent identification component 133 identifies at least one of hot reload agents 112 applicable to a project type of running application 122.

Method 300 also comprises an act 305 of pushing the code change to application runtime(s) via the agent(s). In some embodiments, act 305 comprises, using the one or more hot reload agents, communicating the code change to one or more application runtimes associated with the running software application, wherein at least one process of the running software application invokes at least one of one or more new code entities corresponding to the code change.

In an example, when using a compiled programming language, the change communication component 134 uses each hot reload agent identified in act 304 to communicate a new code entity or entities generated in act 303 to hot reload support 121 of runtime system 120. As a result, the hot reload support 121 of this runtime system 120 updates at least one process (e.g., process 123) of the running application 122 to include the new code entity or entities (e.g., code entity 204 in FIG. 2). Thus, in embodiments, communicating the code change to one or more application runtimes comprises communicating the one or more new compiled code entities to the one or more application runtimes.

In another example, when using an interpreted programming language, the change communication component 134 uses each hot reload agent identified in act 304 to communicate the code change to hot reload support 121 of runtime system 120 in a form that can be interpreted. As a result, the hot reload support 121 this runtime system 120 updates at least one process (e.g., process 123) of the running application 122 to include the code change.

As shown in FIG. 1A, the running application 122 can include a plurality of processes. This means that, in embodiments, the code change pushed out in act 305 is invoked by a plurality of processes (e.g., at least one code entity pushed out in act 305 is invoked by a first process, and at least one code entity pushed out in act 305 is invoked by a second process). Thus, in some embodiments of act 305, each of a plurality of processes of the running software application invokes at least one of the one or more new code entities.

In some embodiments of act 305, each of a plurality of processes of the running software application execute using the same runtime. In other embodiments of act 305, at least two of the plurality of processes execute using different runtimes. For example, as mentioned in connection with act 303, the incremental compilation component 132 may use a plurality of compilers to compile source code of the running application 122—such as in cases when the running application 122 utilizes a plurality of different programming languages and runtimes. Thus, in act 305, code entities may be pushed out to a plurality of different runtimes.

Accordingly, at least some embodiments herein enable hot reloading of a running application with an unsaved source code change. Thus, these embodiments enable source code changes to be applied to a running application substantially immediately after a developer has finished typing a complete code change within an editor program. This streamlines the application development workflow, by removing express steps for saving source code files, rebuilding those source code files, and restarting a subject application. Instead, source code changes are applied to a running application without any extra developer effort.

As discussed, in addition to hot reloading a running application with source code changes, embodiments also include hot reloading a running application with a static file change. For example, embodiments include hot reloading a running application with a static file change 129 that is not yet committed to a static file 118, and/or hot reloading a running application with a new version of static file 118 (e.g., updated by the editor 106 or by an external application). Thus, in some embodiments, method 300 also includes identifying a static file change to source of the running software application. In an example, the change identification component 130 identifies a static file change 129 (e.g., as created by the editor 106) applicable to the running application 122, or determines that static file 118 has been updated (e.g., by editor 106, by an external application, etc.).

Further, in at least some embodiments, method 300 also includes identifying one or more hot reload agents associated with the project type. In an example, if not already known (e.g., based on a prior code change update), the agent identification component 133 identifies at least one of hot reload agents 112 applicable to a project type of running application 122.

Further, in embodiments, method 300 also includes, using the one or more hot reload agents, communicating at least the static file change to the one or more application runtimes associated with the running software application, wherein at least one process of the running software application utilizes the static file change. In an example, the change communication component 134 uses each applicable hot reload agent (e.g., as identified in act 304) to communicate the static file change 129 and/or the new version of static file 118 to hot reload support 121 of runtime system 120. As a result, the hot reload support 121 this runtime system 120 updates at least one process (e.g., process 123) of the running application 122 to utilize the static file change. Like code changes, in embodiments static file changes can apply to multiple processes and/or multiple runtimes.

Accordingly, at least some embodiments herein also enable hot reloading of a running application with a static file change. Thus, these embodiments enable static file changes to be applied to a running application substantially immediately after creation of the static file change. This also streamlines the application development workflow, by removing express steps for saving static files and restarting a subject application. Instead, static file changes are applied to a running application without any extra developer effort.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a hardware storage device comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor and a memory, for hot reloading a running application with an unsaved source code change, the method comprising:
   identifying a code change to a source code of a running software application that is associated with a project type, the code change being stored within an in-memory editor buffer and being uncommitted to any source code file;
   determining that the code change can be applied to the running software application using hot reload;
   identifying one or more hot reload agents associated with the project type; and
   using the one or more hot reload agents, communicating the code change to one or more application runtimes associated with the running software application, wherein at least one process of the running software application invokes at least one of one or more new code entities corresponding to the code change.

2. The method of claim 1, wherein each of a plurality of processes of the running software application invokes at least one of the one or more new code entities.

3. The method of claim 2, wherein at least two of the plurality of processes execute using different runtimes.

4. The method of claim 1, further comprising creating one or more new compiled code entities for the running software application, based on compiling one or more portions of the source code of the running software application that are affected by the code change, and wherein communicating the code change to one or more application runtimes comprises communicating the one or more new compiled code entities to the one or more application runtimes.

5. The method of claim 4, wherein creating the one or more new compiled code entities for the running software application, based on compiling one or more portions of the source code of the running software application that are affected by the code change, comprises using a plurality of different compilers for a plurality of different programming languages.

6. The method of claim 1, wherein determining that the code change is complete and can be applied to the running software application using hot reload comprises determining that the code change is syntactically correct and syntactically complete for a programming language of the source code.

7. The method of claim 1, wherein determining that the code change is complete and can be applied to the running software application using hot reload comprises applying a heuristic to determine that the code change is complete.

8. The method of claim 7, wherein the heuristic determines at least one of:
   whether the code change comprises a complete English word;
   whether the code change comprises an existing code element name;
   whether a threshold amount of time has transpired since typing has concluded; or
   whether the code change is on a dead-end path.

9. The method of claim 1, wherein determining that the code change is complete and can be applied to the running software application using hot reload comprises determining that the code change is compatible with hot reload.

10. The method of claim 1, further comprising:
    identifying a static file change to source of the running software application; and
    using the one or more hot reload agents, communicating at least the static file change to the one or more application runtimes associated with the running software application, wherein at least one process of the running software application utilizes the static file change.

11. The method of claim 4, wherein the one or more new compiled code entities comprises at least one of a method or a type.

12. A computer system for hot reloading a running application with an unsaved source code change, comprising:
    a processor; and
    a hardware storage device that stores computer-executable instructions that are executable by the processor to cause the computer system to at least:
       identify a code change to a source code of a running software application that is associated with a project type, the code change being stored within an in-memory editor buffer and being uncommitted to any source code file;

determine that the code change can be applied to the running software application using hot reload;

identify one or more hot reload agents associated with the project type; and using the one or more hot reload agents, communicate the code change to one or more application runtimes associated with the running software application, wherein at least one process of the running software application invokes at least one of one or more new code entities corresponding to the code change.

13. The computer system of claim 12, wherein each of a plurality of processes of the running software application invokes at least one of the one or more new code entities.

14. The computer system of claim 13, wherein at least two of the plurality of processes execute using different runtimes.

15. The computer system of claim 12, the computer-executable instructions also executable by the processor to cause the computer system to create one or more new compiled code entities for the running software application, based on compiling one or more portions of the source code of the running software application that are affected by the code change, and wherein communicating the code change to one or more application runtimes comprises communicating the one or more new compiled code entities to the one or more application runtimes.

16. The computer system of claim 15, wherein creating the one or more new compiled code entities for the running software application, based on compiling one or more portions of the source code of the running software application that are affected by the code change, comprises using a plurality of different compilers for a plurality of different programming languages.

17. The computer system of claim 12, wherein determining that the code change is complete and can be applied to the running software application using hot reload comprises determining that the code change is syntactically correct and syntactically complete for a programming language of the source code.

18. The computer system of claim 12, wherein determining that the code change is complete and can be applied to the running software application using hot reload comprises applying a heuristic to determine that the code change is complete.

19. The computer system of claim 12, the computer-executable instructions also executable by the processor to cause the computer system to at least:

identify a static file change to source of the running software application; and using the one or more hot reload agents, communicate at least the static file change to the one or more application runtimes associated with the running software application, wherein at least one process of the running software application utilizes the static file change.

20. A hardware storage device that stores computer-executable instructions that are executable by a processor to cause a computer system to hot reload a running application with an unsaved source code change, the computer-executable instructions including instructions that are executable by the processor to cause the computer system to at least:

identify a code change to a source code of a running software application that is associated with a project type, the code change being stored within an in-memory editor buffer and being uncommitted to any source code file;

determine that the code change can be applied to the running software application using hot reload;

identify one or more hot reload agents associated with the project type; and using the one or more hot reload agents, communicate the code change to one or more application runtimes associated with the running software application, wherein at least one process of the running software application invokes at least one of one or more new code entities corresponding to the code change.

* * * * *